(12) United States Patent
Matsushita

(10) Patent No.: US 11,075,034 B2
(45) Date of Patent: Jul. 27, 2021

(54) CERAMIC ELECTRONIC DEVICE AND MANUFACTURING METHOD OF THE SAME

(71) Applicant: TAIYO YUDEN CO., LTD., Tokyo (JP)

(72) Inventor: Yuji Matsushita, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 39 days.

(21) Appl. No.: 16/664,484

(22) Filed: Oct. 25, 2019

(65) Prior Publication Data

US 2020/0152381 A1   May 14, 2020

(30) Foreign Application Priority Data

Nov. 8, 2018 (JP) .............. JP2018-210929

(51) Int. Cl.
*H01G 4/12* (2006.01)
*H01G 4/30* (2006.01)

(52) U.S. Cl.
CPC ............. *H01G 4/12* (2013.01); *H01G 4/30* (2013.01)

(58) Field of Classification Search
CPC .................................. H01G 4/12; H01G 4/30
USPC .................................................... 361/301.4
See application file for complete search history.

(56) References Cited

U.S. PATENT DOCUMENTS

| | | | |
|---|---|---|---|
| 9,093,220 B1 * | 7/2015 | Kitano | H01G 4/232 |
| 9,111,691 B2 * | 8/2015 | Hamada | H01G 4/232 |
| 2006/0207078 A1 * | 9/2006 | Namerikawa | H01L 41/0831 29/25.35 |
| 2006/0245141 A1 | 11/2006 | Shirasu et al. | |
| 2020/0152381 A1 | 5/2020 | Matsushita | |

FOREIGN PATENT DOCUMENTS

| | | |
|---|---|---|
| JP | H06140277 A | 5/1994 |
| JP | H07235442 A | 9/1995 |
| JP | 2001217137 A | 8/2001 |
| JP | 2005085823 A | 3/2005 |
| JP | 2006332601 A | 12/2006 |
| JP | 2016086118 A | 5/2016 |
| JP | 2018121025 A | 8/2018 |
| JP | 2020077798 A | 5/2020 |

* cited by examiner

*Primary Examiner* — Timothy J Thompson
*Assistant Examiner* — Michael F McAllister
(74) *Attorney, Agent, or Firm* — Law Office of Katsuhiro Arai

(57) ABSTRACT

A ceramic electronic device includes: a multilayer chip in which each of a plurality of dielectric layers and each of a plurality of internal electrode layers are alternately stacked; a first external electrode provided on the first end face; and a second external electrode provided on the second end face, wherein a first dielectric layer of the plurality of dielectric layers has a concavity which is recessed toward one side of a stacking direction of the multilayer chip, wherein a first internal electrode layer of the plurality of internal electrode layers crosses the concavity and has a cutout in the concavity, wherein the first internal electrode layer is next to the first dielectric layer and is positioned on other side of the stacking direction.

10 Claims, 10 Drawing Sheets

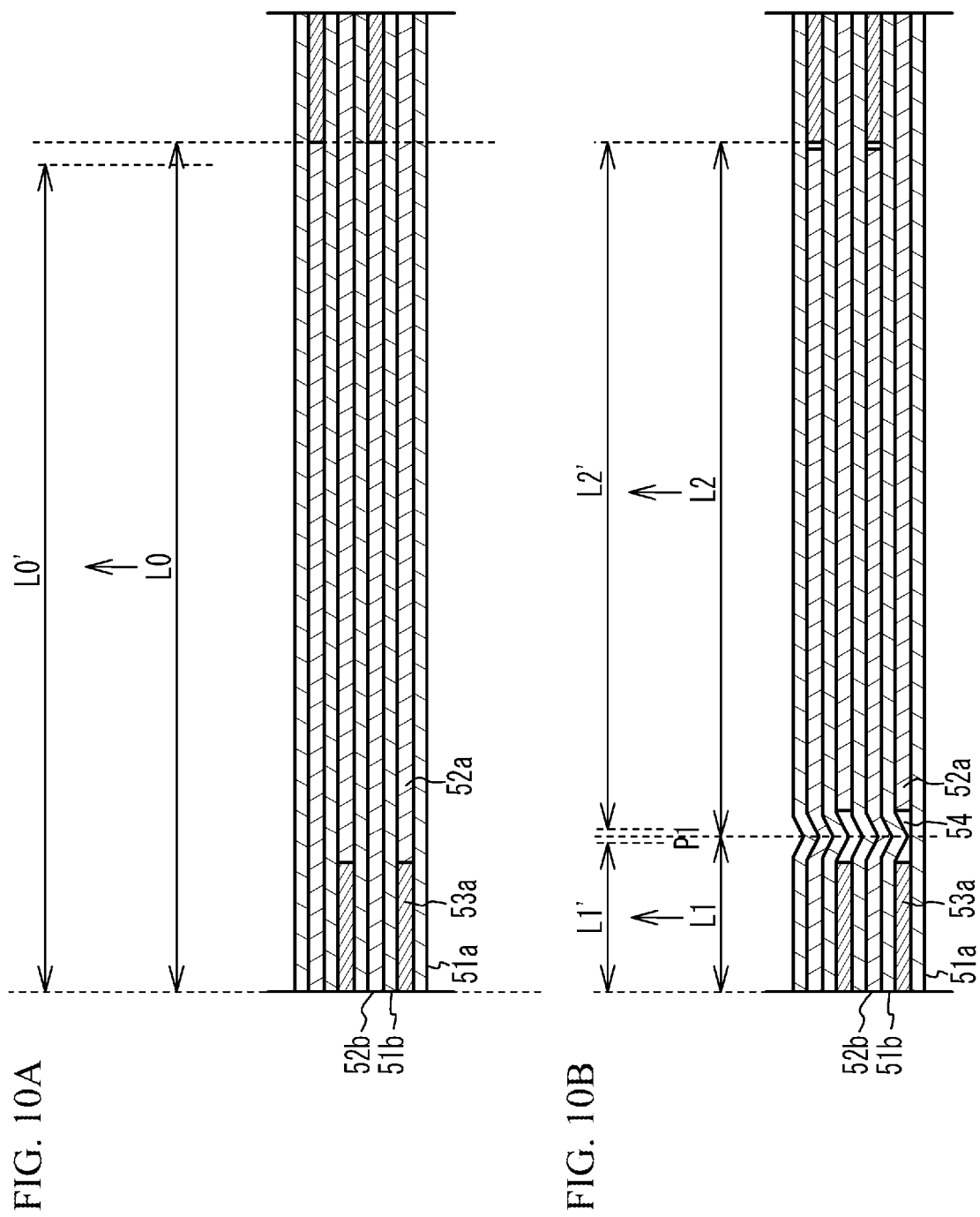

US 11,075,034 B2

CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2018-210929, filed on Nov. 8, 2018, the entire contents of which are incorporated herein by reference.

FIELD

A certain aspect of the present invention relates to a ceramic electronic device and a manufacturing method of the ceramic electronic device.

BACKGROUND

In ceramic electronic devices such as multilayer ceramic capacitors, contact defect between internal electrode layers and an external electrode has a large influence on performance. And so, there is disclosed a technology for suppressing the contact defect between the internal electrode layers and the external electrode (for example, see Japanese Patent Application Publication No. H06-140277 and Japanese Patent Application Publication No. 2006-332601).

SUMMARY OF THE INVENTION

In developing of small size devices having large capacity, thicknesses of the internal electrode layers are reduced together with dielectric layers. When the thicknesses of the internal electrode layers are reduced, contraction of the internal electrode layers occurred in a firing process tends to concentrate in an in-plane direction of the internal electrode layers. Therefore, the contact defect between the internal electrode layers and the external electrode may not be necessarily suppressed, with the above-mentioned technology.

In particular, in a simultaneous firing for firing the external electrode together with the internal electrode layers, increasing of a size change rate of the internal electrode layers has a large influence on the contact defect between the internal electrode layers and the external electrode. Therefore, in the case where the thicknesses of the internal electrode layers are reduced, it is preferable that concentration of the contraction stress in the in-plane direction is suppressed.

The present invention has a purpose of providing a ceramic electronic device and a manufacturing method of the ceramic electronic device that are capable of suppressing contraction stress in an internal electrode layer.

According to an aspect of the present invention, there is provided a ceramic electronic device including: a multilayer chip in which each of a plurality of dielectric layers and each of a plurality of internal electrode layers are alternately stacked, a main component of the dielectric layers being ceramic, the multilayer structure having a rectangular parallelepiped shape, the plurality of internal electrode layers being alternately exposed to a first end face and a second end face of the multilayer structure, the first end face facing with the second end face, a first external electrode provided on the first end face; and a second external electrode provided on the second end face, wherein a first dielectric layer of the plurality of dielectric layers has a concavity which is recessed toward one side of a stacking direction of the multilayer chip, wherein a first internal electrode layer of the plurality of internal electrode layers crosses the concavity and has a cutout in the concavity, wherein the first internal electrode layer is next to the first dielectric layer and is positioned on other side of the stacking direction.

According to another aspect of the present invention, there is provided a manufacturing method of a ceramic electronic device including; a first process of providing a first pattern of metal conductive paste on a green sheet including main component ceramic grains; a second process of providing a second pattern including main component ceramic grains, on an area of the green sheet around the metal conductive paste; a third process of stacking a plurality of stack units obtained by the second process so that positions of the first pattern are alternately shifted and the first pattern is alternately exposed to two end faces of a ceramic multilayer structure obtained by the stacking; and a fourth process of firing a ceramic multilayer structure obtained by the third process, wherein, in the ceramic multilayer structure before the firing of the fourth process, a first stack unit of the plurality of stack units has a concavity on a surface on a side of a second stack unit next to the first stack unit, wherein the concavity is located on a part of an area of the metal conductive paste of the second stack unit.

BRIEF DESCRIPTION OF THE DRAWINGS

FIG. 10A and FIG. 10B illustrates size change rate.

DETAILED DESCRIPTION

A description will be given of an embodiment with reference to the accompanying drawings.

Figure 1:
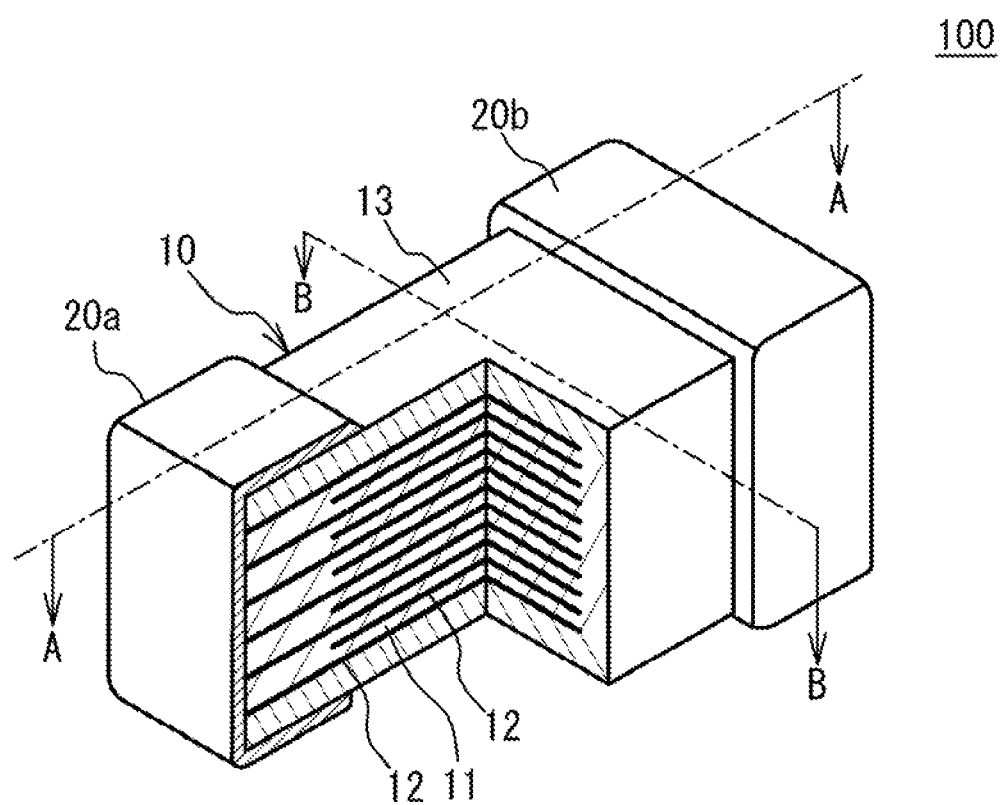
FIG. 1 illustrates a perspective view of a multilayer ceramic capacitor in which a cross section of a part of the multilayer ceramic capacitor is illustrated.
Figure 2:
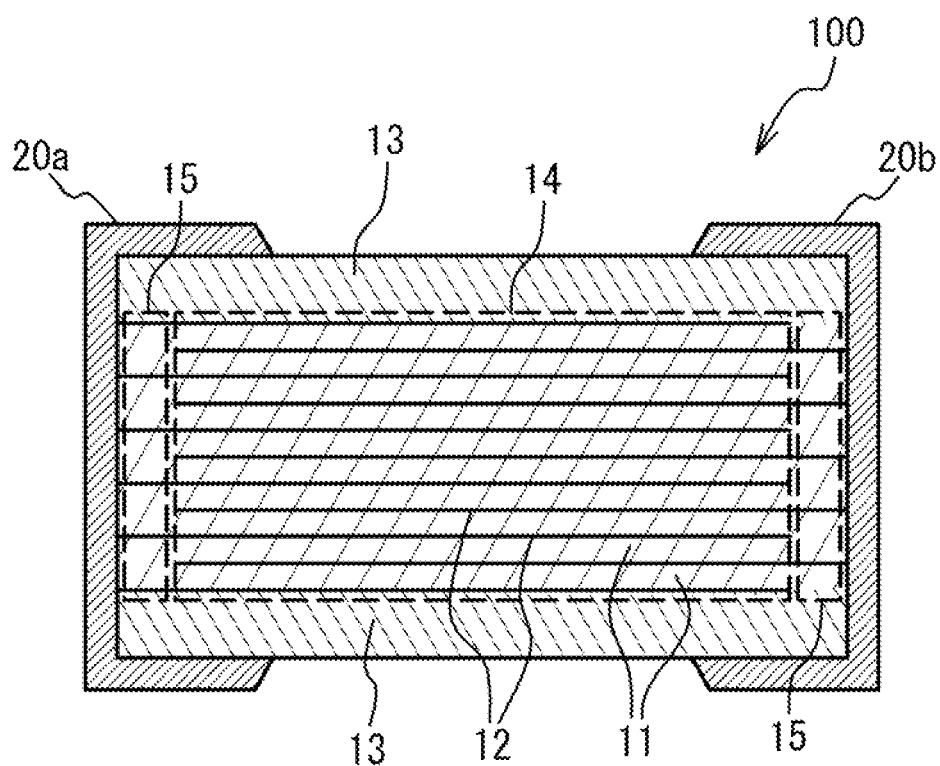
FIG. 2 illustrates a cross sectional view taken along a line A-A of FIG. 1.
Figure 3:
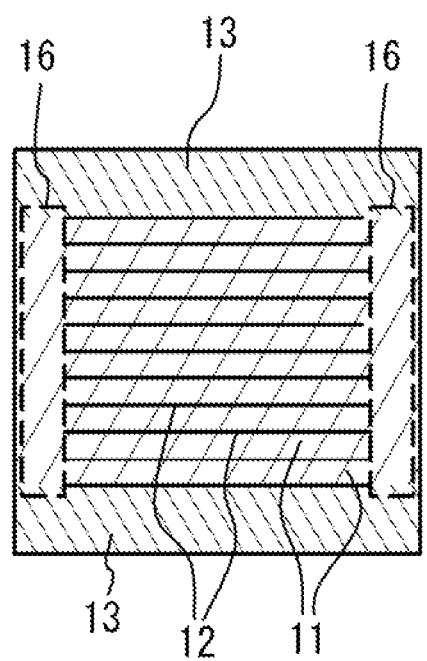
FIG. 3 illustrates a cross sectional view taken along a line B-B of FIG. 1.

(Embodiment) A description will be given of an outline of a multilayer ceramic capacitor. FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other. In FIG. 1, an X-axis direction (first direction) is a length direction of the multilayer chip 10. In the X-axis direction, the two end faces of the multilayer chip 10 face with each other. Moreover, in the X-axis direction, the external electrode 20a faces with the external electrode 20b. A Y-axis direction (second direction) is a width direction of the internal electrode layers 12. A Z-axis direction is the stacking direction. The X-axis direction, the Y-axis direction and the Z-axis direction are vertical to each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face faces with the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, the internal electrode layer 12 is positioned at an outermost layer in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25±0.015 mm, a width of 0.125±0.015 mm and a height of 0.125±0.015 mm. The multilayer ceramic capacitor 100 may have a length of 0.4±0.02 mm, a width of 0.2±0.02 mm and a height of 0.2±0.02 mm. The multilayer ceramic capacitor 100 may have a length of 0.6±0.03 mm, a width of 0.3±0.03 mm and a height of 0.3±0.03 mm. The multilayer ceramic capacitor 100 may have a length of 1.0±0.05 mm, a width of 0.5±0.05 mm and a height of 0.5±0.05 mm. The multilayer ceramic capacitor 100 may have a length of 3.2±0.15 mm, a width of 1.6±0.15 mm and a height of 1.6±0.15 mm. The multilayer ceramic capacitor 100 may have a length of 4.5±0.4 mm, a width of 3.2±0.3 mm and a height of 2.5±0.2 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

As illustrated in FIG. 2, a region, in which a set of the internal electrode layers 12 connected to the external electrode 20a face another set of the internal electrode layers 12 connected to the external electrode 20b, is a region generating electrical capacity in the multilayer ceramic capacitor 100. And so, the region is referred to as a capacity region 14. That is, the capacity region 14 is a region in which the internal electrode layers 12 next to each other being connected to different external electrodes face each other.

A region, in which the internal electrode layers 12 connected to the external electrode 20a face with each other without sandwiching the internal electrode layer 12 connected to the external electrode 20b, is referred to as an end margin region 15. A region, in which the internal electrode layers 12 connected to the external electrode 20b face with each other without sandwiching the internal electrode layer 12 connected to the external electrode 20a is another end margin region 15. That is, the end margin region 15 is a region in which a set of the internal electrode layers 12 connected to one external electrode face with each other without sandwiching the internal electrode layer 12 connected to the other external electrode. The end margin region 15 is a region that does not generate electrical capacity in the multilayer ceramic capacitor 100.

As illustrated in FIG. 3, a region of the multilayer chip 10 from the two sides thereof to the internal electrode layers 12 is referred to as a side margin region 16. That is, the side margin region 16 is a region covering edges of the stacked internal electrode layers 12 in the extension direction toward the two side faces.

Figure 4A:
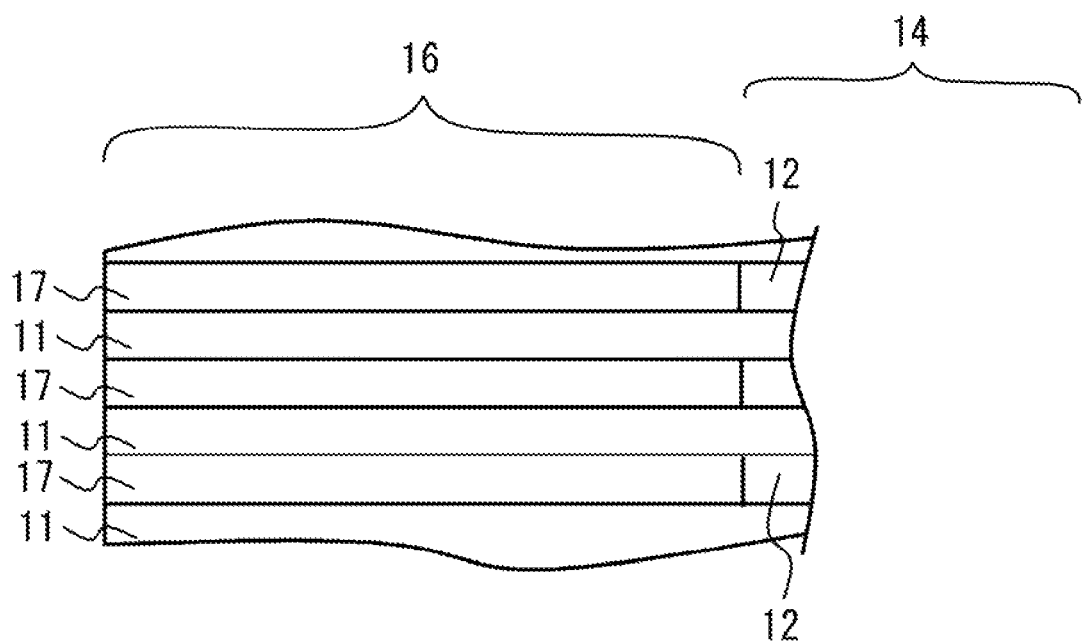
FIG. 4A illustrates an enlarged view of a cross section of a side margin region.

FIG. 4A illustrates an enlarged view of the cross section of the side margin region 16. The side margin region 16 has a structure in which the dielectric layer 11 and a reverse pattern layer 17 are alternately stacked in a stacking direction of the dielectric layer 11 and the internal electrode layer 12 in the capacity region 14. Each of the dielectric layers 11 of the capacity region 14 are continuously formed with each of the dielectric layers 11 of the side margin region 16. With the structure, a level difference between the capacity region 14 and the side margin region 16 is suppressed.

Figure 4B:
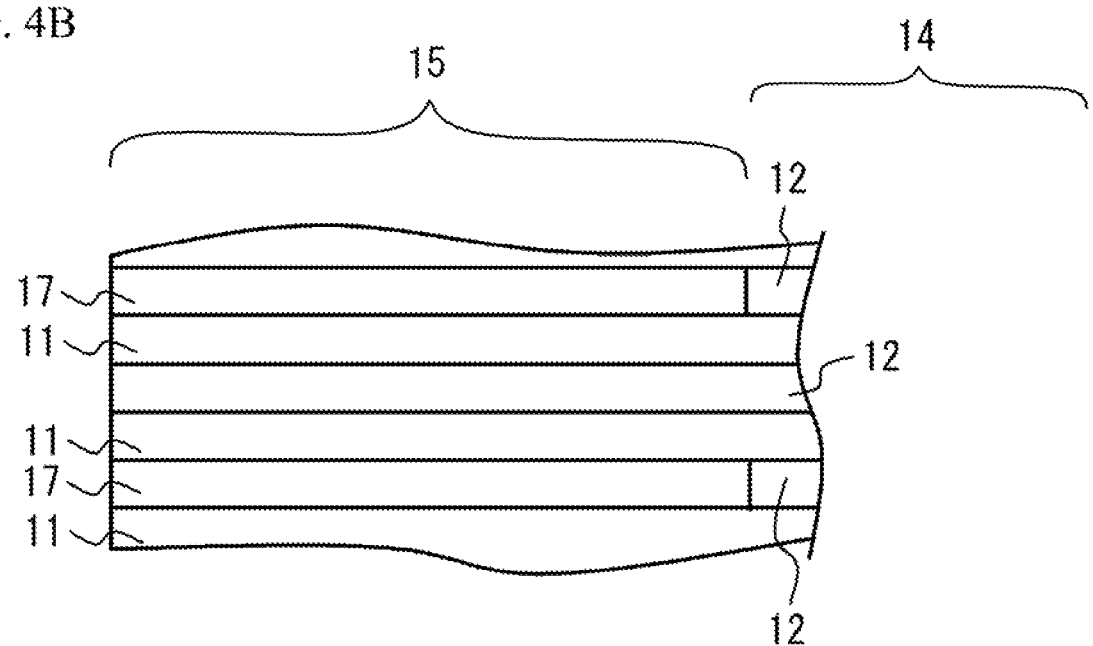
FIG. 4B illustrates an enlarged view of a cross section of an end margin region.

FIG. 4B illustrates an enlarged view of the cross section of the end margin region 15. Compared to the side margin region 16, in the end margin region 15, every other layer, the internal electrode layers 12 extends to the edge face of the end margin region 15. The reverse pattern layer 17 is not provided in a layer where the internal electrode layer 12 extends to the end face of the end margin region 15. Each of the dielectric layers 11 of the capacity region 14 is continuously formed with each of the dielectric layers 11 of the end margin region 15. With the structure, a level difference between the capacity region 14 and the end margin region 15 is suppressed.

The internal electrode layer 12 of the multilayer ceramic capacitor 100 having the structure is manufactured by firing raw material powder of the main component metal. In order to develop multilayer ceramic capacitors having a small size and a large capacity, thicknesses of dielectric layers and internal electrode layers are reduced. When the thicknesses of the internal electrode layers are reduced, contraction of the internal electrode layers in the firing tends to concentrate in an in-plane direction.

Figure 5:
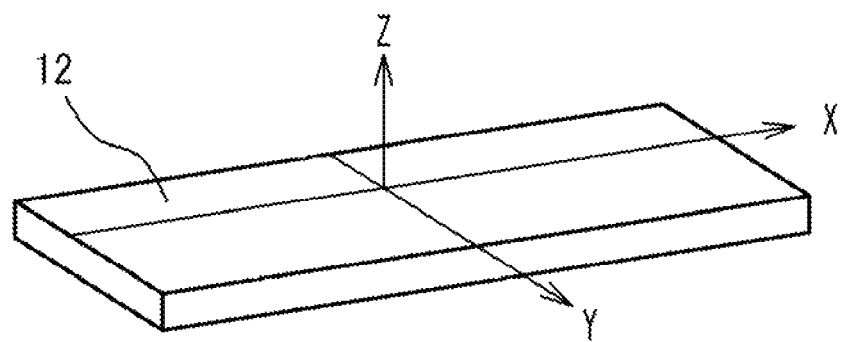
FIG. 5 illustrates contraction stress in an internal electrode layer.

As illustrated in FIG. 5, the internal electrode layer 12 is formed in parallel with a XY-plane and has a thickness in the Z-axis direction. The contraction of the internal electrode layer 12 tends to concentrate in an in-plane direction of the XY plane. In particular, the contraction tends to concentrate in the X-axis direction which is a longitudinal direction of the internal electrode layer 12. Therefore, contact defect may occur between the internal electrode layers 12 and the external electrodes 20a and 20b. In particular, in a simultaneous firing for firing of the internal electrode layers 12 and the external electrodes 20a and 20b together with each other, the external electrodes 20a and 20b are formed without exposing the internal electrode layers by grinding the two end faces of the fired multilayer chip 10. In this case, increasing of a size change rate of the internal electrode layer 12 influences on the contact defect between the internal electrode layers 12 and the external electrodes 20a and 20b.

Therefore, when the thicknesses of the internal electrode layers 12 are reduced, it is requested that concentration of contraction stress in the in-plane direction is suppressed. The multilayer ceramic capacitor 100 of the embodiment has a structure for suppressing the contraction stress of the internal electrode layers 12. A description will be given of details.

Figure 6A:
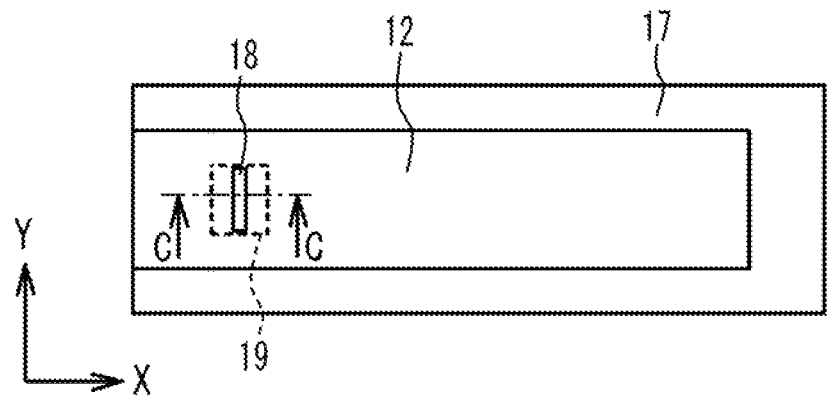
FIG. 6A illustrates a plan view of an internal electrode layer and a reverse pattern layer from a stacking direction.

FIG. 6A illustrates a plan view of the internal electrode layer 12 and the reverse pattern layer 17 from a stacking direction (Z-axis direction of FIG. 5). In FIG. 6A, the internal electrode layer 12 connected to the external electrode 20a illustrated in FIG. 1 is illustrated. As illustrated in FIG. 6A, a cutout 18 is formed in the internal electrode layer 12. A longitudinal direction of the cutout 18 intersects with the X-axis direction. It is preferable that the longitudinal direction of the cutout 18 is in parallel with the Y-axis direction. In the structure, even if contraction stress occurs in the in-plane direction of the internal electrode layer 12, the contraction stress is released in the cutout 18. Thus, the contraction stress in the in-plane direction of the internal electrode layer 12 is suppressed. Therefore, the contact defect between the internal electrode layer 12 and the external electrodes 20a is suppressed.

Figure 6B:
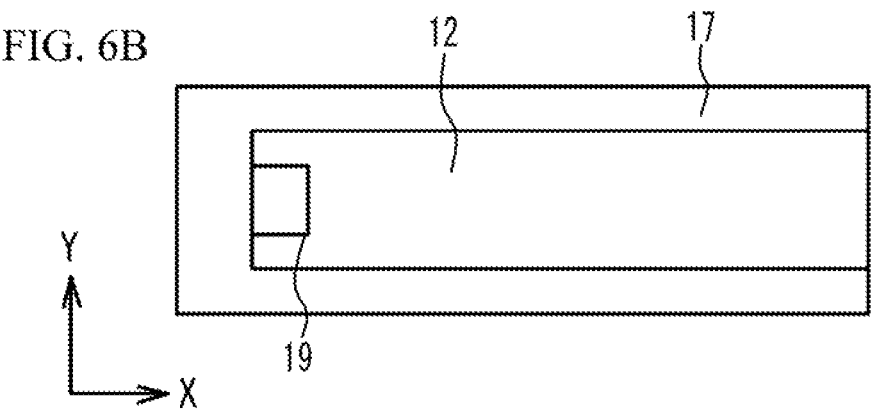
FIG. 6B illustrates a plan view of another internal electrode layer which is positioned below an internal electrode layer of FIG. 6A and a reverse pattern layer around the internal electrode layer.
Figure 6C:
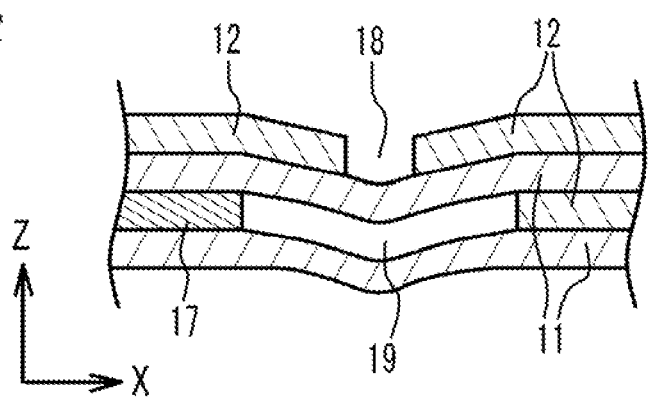
FIG. 6C illustrates a cross sectional view taken along a line C-C of FIG. 6A.

FIG. 6B illustrates a plan view of another internal electrode layer 12 which is positioned below the internal electrode layer 12 of FIG. 6A and next to the internal electrode layer 12 of FIG. 6A through the dielectric layer 11, and the reverse pattern layer 17 around the internal electrode layer 12 of FIG. 6B. That is, FIG. 6B illustrates the internal electrode layer 12 connected to the external electrode 20b illustrated in FIG. 1. FIG. 6C illustrates a cross sectional view taken along a line C-C of FIG. 6A. As illustrated in FIG. 6B and FIG. 6C, a cutout 19 is formed in the internal electrode layer 12 and the reverse pattern layer 17 which are below the internal electrode layer 12 having the cutout 18 in the Z-axis direction and are next to the internal electrode layer 12 having the cutout 18 through the dielectric layer 11. A longitudinal direction of the cutout 19 is substantially the same as the longitudinal direction of the cutout 18. The longitudinal direction of the cutout 19 intersects with the X-axis direction. It is preferable that the longitudinal direction of the cutout 19 is in parallel with the Y-axis direction. The cutout 19 may be formed in at least one of the internal electrode layer 12 and the reverse pattern layer 17. The cutout 19 may extend from the internal electrode layer 12 to the reverse pattern layer 17. When the cutout 19 is formed, the dielectric layer 11 on the cutout 19 is bent so as to be recessed toward the cutout 19. Thus, the cutout 18 is formed. It is preferable that a size of the cutout 19 is larger than a size of the cutout 18 in the X-axis direction.

In this manner, the dielectric layer 11 (first dielectric layer) on the cutout 19 has a concavity recessed toward one side of the stacking direction. The internal electrode layer 12 (first internal electrode layer) which is next to the dielectric layer 11 on the other side of the stacking direction crosses the concavity and has the cutout 18 in the concavity. With the structure, the contraction stress is suppressed in the in-plane direction of the internal electrode layer 12.

It is preferable that the positions of the cutout 18 and the cutout 19 are determined so that influence on the electrical capacity of the capacity region 14 is small. For example, as illustrated in FIG. 6A, it is preferable that the position of the cutout 18 is a half of the multilayer chip 10 in the X-axis direction or on the external electrode (first external electrode) side connected to the internal electrode layer 12. This is because the contraction stress applied to the extraction portion of the internal electrode layer 12 (a portion corresponding to the end margin region 15) can be reduced.

As illustrated in FIG. 6B, it is preferable that the cutout 19 and the concavity of the dielectric layer 11 on the cutout 19 are located on an end of the internal electrode layer 12 (second internal electrode layer) on the side of the external electrode 20a in the X-axis direction. This is because the contraction stress applied to the extraction portion of the internal electrode layer 12 is reduced, and the influence of the cutout 19 on the capacity of the capacity region 14 is reduced.

The length of the cutout 18 in the longitudinal direction is not limited. From a viewpoint of sufficient suppression of the contraction stress of the internal electrode layer 12 in the X-axis direction, it is preferable that the length is close to a width of the internal electrode layer 12 in the Y-axis direction. For example, it is preferable that the length of the cutout 18 in the longitudinal direction is a half of the width of the internal electrode layer 12 in the Y-axis direction or more. On the other hand, when the length of the cutout 18 is excessively large, the internal electrode layer 12 may be divided. And so, it is preferable that the length of the cutout 18 is ¾ of the width of the internal electrode layer 12 in the Y-axis direction or less.

It is preferable that the cutout 18 is formed in two or more of the internal electrode layers 12 connected to the external electrode 20a. It is preferable that the cutout 18 is formed in all of the internal electrode layers 12 connected to the external electrode 20a.

In the embodiment, the cutout 18 is formed in the internal electrode layer 12 connected to the external electrode 20a. However, the cutout 18 may be formed in the internal electrode layer 12 connected to the external electrode 20b. The cutout 18 may be formed in the internal electrode layer 12 connected to the external electrode 20a and the internal electrode layer 12 connected to the external electrode 20b.

Figure 7:
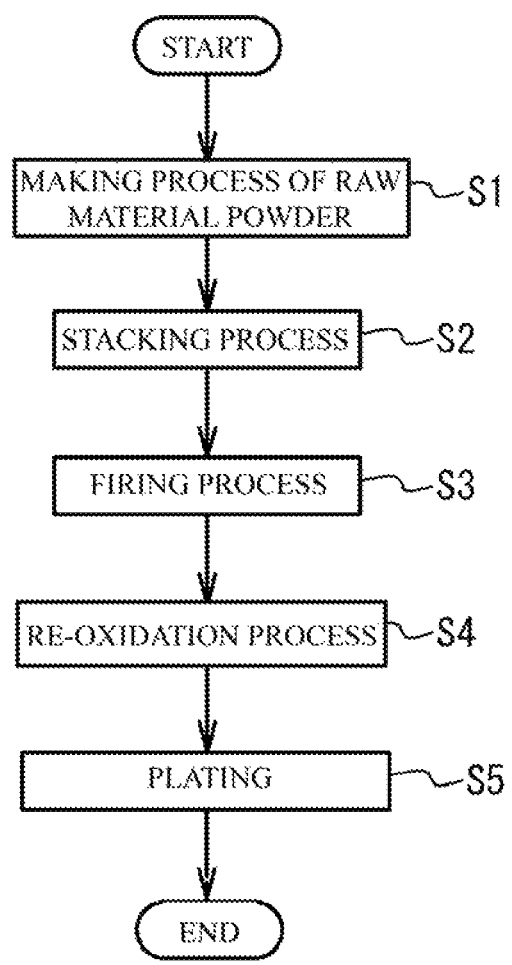
FIG. 7 illustrates a manufacturing method of a multilayer ceramic capacitor.

Next, a description will be given of a manufacturing method of the multilayer ceramic capacitor 100. FIG. 7 illustrates a manufacturing method of the multilayer ceramic capacitor 100.

(Making process of raw material powder) A dielectric material for forming the dielectric layer 11 is prepared as illustrated in FIG. 7. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to resulting ceramic powders, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B (boron), Na (sodium), K (potassium) and Si, or glass.

In the embodiment, it is preferable that ceramic particles structuring the dielectric layer 11 are mixed with compound including additives and are calcined in a temperature range from 820 degrees C. to 1150 degrees C. Next, the resulting ceramic particles are wet-blended with additives, are dried and crushed. Thus, ceramic powder is obtained. For example, it is preferable that an average grain diameter of the resulting ceramic powder is 50 nm to 300 nm from a viewpoint of thickness reduction of the dielectric layer 11. The grain diameter may be adjusted by crushing the resulting ceramic powder as needed. Alternatively, the grain diameter of the resulting ceramic power may be adjusted by combining the crushing and classifying.

Next, a reverse pattern material for forming the end margin region 15 and the side margin region 16 is prepared. An additive compound may be added to ceramic powder of barium titanate obtained by the same process as the dielectric material, in accordance with purposes. The additive compound may be an oxide of Mg, Mn, V, Cr or a rare earth element (Y, Sm, Eu, Gd, Tb, Dy, Ho, Er, Tm and Yb), or an oxide of Co, Ni, Li, B, Na, K and Si, or glass.

In the embodiment, it is preferable that ceramic particles structuring the end margin region 15 and the side margin region 16 are mixed with compound including additives and are calcined in a temperature range from 820 degrees C. to 1150 degrees C. Next, the resulting ceramic particles are wet-blended with additives, are dried and crushed. Thus, ceramic powder is obtained. For example, the grain diameter of the resulting ceramic powder may be adjusted by crushing the resulting ceramic powder as needed. Alternatively, the grain diameter of the resulting ceramic power may be adjusted by combining the crushing and classifying.

(Stacking process) Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet 51a with a thickness of 0.8 μm or less is coated on a first base material by, for example, a die coater method or a doctor blade method, and then dried.

Figure 8A:
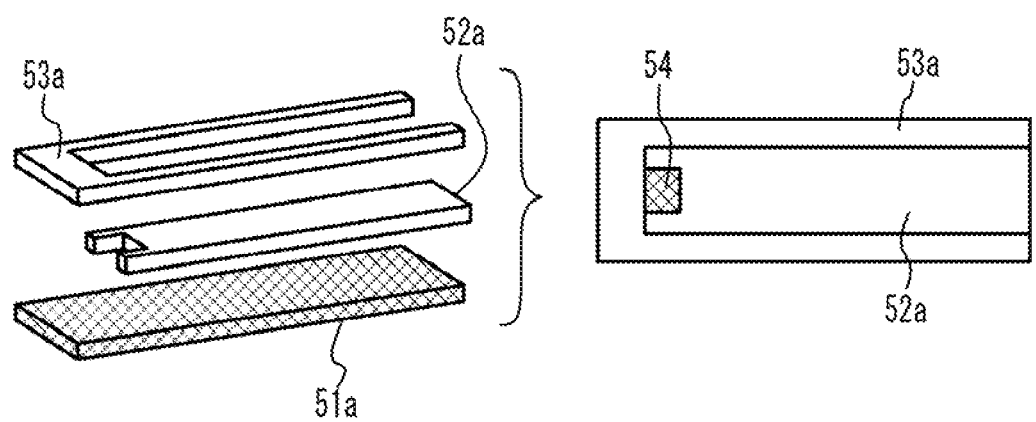
FIG. 8A and FIG. 8B illustrate a manufacturing process of a stack unit.

Next, as illustrated in FIG. 8A, metal conductive paste for forming an internal electrode is coated on the surface of the dielectric green sheet 51a by screen printing or gravure printing. The metal conductive paste includes an organic binder. Thus, a first pattern 52a for forming an internal electrode layer is provided. As co-materials, ceramic particles are added to the metal conductive paste. A main component of the ceramic particles is not limited. However, it is preferable that the main component of the ceramic particles is the same as that of the dielectric layer 11.

Next, a binder and an organic solvent are added to the reverse pattern material. The binder is such as ethyl cellulose. The organic solvent is such as terpineol. And the reverse pattern material is kneaded with the binder and the organic solvent by a roll mill. Thus, reverse pattern paste is obtained. The reverse pattern paste is printed on a circumference area of the dielectric green sheet 51a. The circumference area is a part of the dielectric green sheet 51a where the first pattern 52a is not printed. Thus, a second pattern 53a is provided. Therefore, a level difference caused by the first pattern 52a is buried. The dielectric green sheet 51a, the first pattern 52a and the second pattern 53a act as a first stack unit.

Figure 8B:
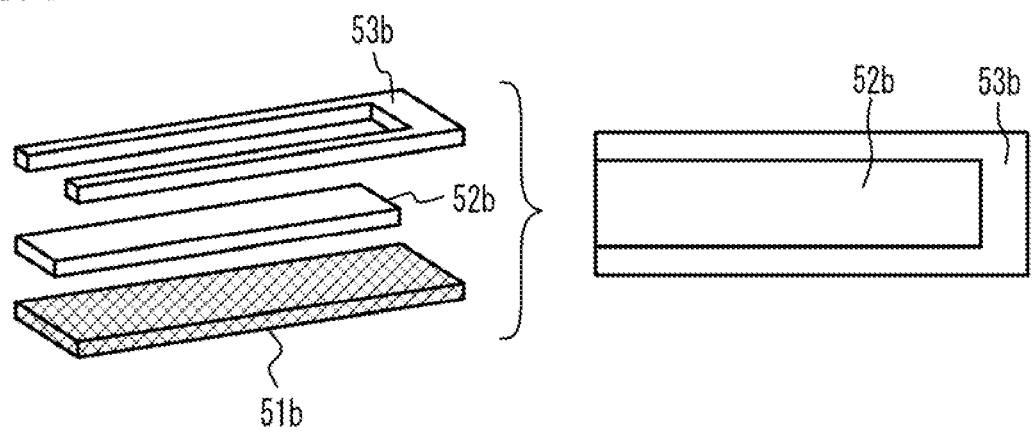

As illustrated in FIG. 8B, with the same processes, a dielectric green sheet 51b is coated on a second base material and is dried. After that, a first pattern 52b for forming an internal electrode layer is formed on a surface of the dielectric green sheet 51b. After that, a second pattern 53b is formed on an area on the dielectric green sheet 51b where the first pattern 52b is not printed. The dielectric green sheet 51b, the first pattern 52b and the second pattern 53b act as a second stack unit. The second stack unit is stacked on the first stack unit.

As illustrated in FIG. 8A, a concavity is formed on a surface of the first stack unit on the side of the second stack unit. The concavity is located in a part of an area where the first pattern 52b of the second stack unit is stacked. In concrete, an opening 54 is formed on the dielectric green sheet 51a. For example, it is possible to form the opening 54 by forming the concavity in a circumference portion of the first pattern 52a, or not arranging the second pattern 53a on a part of the area where the first pattern 52a is not printed on the dielectric green sheet 51a. The opening 54 corresponds to the cutout 19 described on the basis of FIG. 6B.

Then, the dielectric green sheet 51a and the dielectric green sheet 51b are alternately stacked while the first base material and the second base material are peeled so that the internal electrode layers 12 and the dielectric layers 11 are alternated with each other and the end edges of the internal electrode layers 12 are alternately exposed to both end faces in the length direction of the dielectric layer 11 so as to be alternately led out to a pair of external electrodes 20a and 20b of different polarizations. For example a total number of the staked dielectric green sheets is 100 to 500.

Figure 9A:
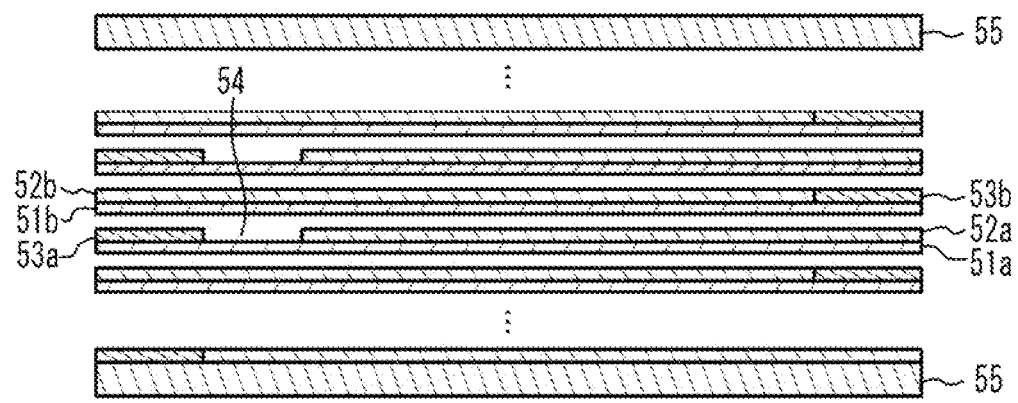
FIG. 9A illustrates a stack structure during stacking.

FIG. 9A illustrates a case where each of the first stack units and each of the second stack units are alternately stacked. As illustrated in FIG. 9A, the dielectric green sheet 51b is stacked on the opening 54 on the dielectric green sheet 51a.

Figure 9B:
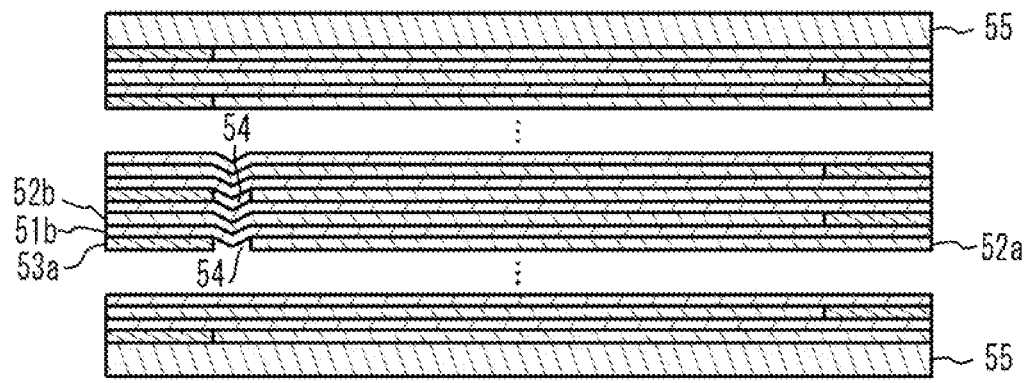
FIG. 9B illustrates a stack structure after crimping.

After that, a cover sheet 55 to be the cover layer 13 is crimped on the multilayer structure of the dielectric green sheets. And another cover sheet 55 to be the cover layer 13 is crimped under the multilayer structure. Thus, a ceramic multilayer structure is obtained. In this case, as illustrated in FIG. 9B, the dielectric green sheet 51b and the first pattern 52b on the dielectric green sheet 51b are bent so as to be recessed toward the opening 54.

A plurality of dielectric green sheets 51a coated on a common face of a sheet and a plurality of dielectric green sheets 51b coated on a common face of another sheet are alternately stacked. The stack structure is stamped into a chip having a predetermined size. Thus, the ceramic multilayer structure may be obtained.

After that, the binder is removed from the ceramic multilayer structure (for example, 1.0 mm×0.5 mm) in $N_2$ atmosphere of 250 degrees C. to 500 degrees C. After that, metal conductive paste for the external electrodes 20a and 20b is coated on the both end faces of the ceramic multilayer structure by a dipping method or the like and is dried. Thus, a compact of the multilayer ceramic capacitor 100 is obtained.

(Firing process) The resulting compact is fired for ten minutes to 2 hours in a reductive atmosphere having an oxygen partial pressure of $10^{-5}$ to $10^{-8}$ atm in a temperature range of 1100 degrees C. to 1300 degrees C. Thus, each compound of the dielectric green sheet is sintered and grown into grains. In this manner, it is possible to manufacture the multilayer ceramic capacitor 100.

Figure 9C:
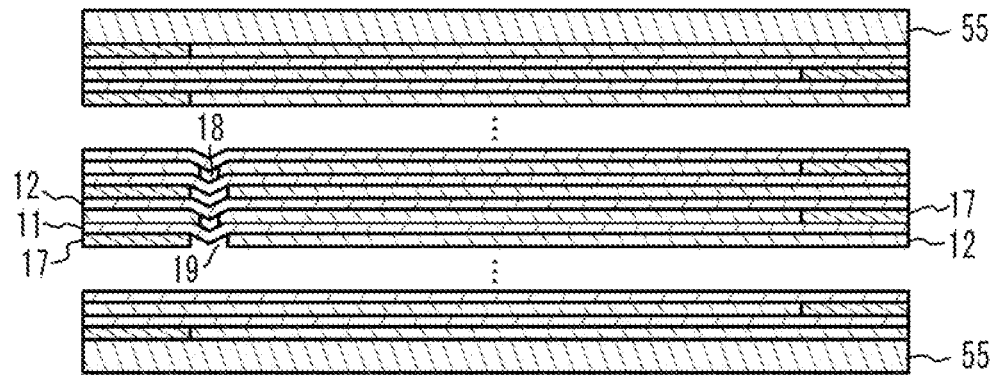
FIG. 9C illustrates a stack structure after firing.

In the sintering, the contraction stress of the internal electrode layer 12 is concentrated in the bent portion. Thus, as illustrated in FIG. 9C, a cutout may occur in the internal electrode layer 12 on the cutout 19 corresponding to the opening 54. Thereby, the contraction stress is released. And, the cutout 18 may occur.

(Re-oxidizing process) After that, a re-oxidizing process may be performed in $N_2$ gas atmosphere in a temperature range of 600 degrees C. to 1000 degrees C.

(Plating process) After that, with a plating process, a metal such as Cu, Ni, and Sn may be coated on the external electrodes 20a and 20b.

In the embodiment, the size change rate of the internal electrode layer 12 is reduced in the firing process. FIG. 10A and FIG. 10B illustrate the size change rate. FIG. 10A illustrates the size of the internal electrode layer 12 in a case where the opening 54 is not formed and the cutout 18 is not formed in the internal electrode layer 12. As illustrated in FIG. 10A, a length of the first pattern 52b in the X-axis direction before the firing process is L0. A length of the internal electrode layer 12 corresponding to the first pattern 52b after the firing process is L0'. L0' is smaller than L0 because of the contraction stress. In this case, the size change rate ΔL0 of the internal electrode layer 12 is expressed by the following formula (1).

$$\Delta L0 = (L0 - L0')/L0 \tag{1}$$

FIG. 10B illustrates the size of the internal electrode layer 12 in a case where the opening 54 is formed and the cutout 18 is formed in the internal electrode layer 12. As illustrated in FIG. 10B, in the first pattern 52b before the firing process, a length of a first portion in the X-axis direction is L1. The first portion is from a position where the cutout 18 is to be formed to an edge face. A length of a second portion in the X-axis direction is L2. The second portion is from the position where the cutout 18 is to be formed to another edge. A length of the first portion in the X-axis direction after the firing process is L1'. A length of the second portion in the X-axis direction after the firing process is L2'. L1' is smaller than L1 because of the contraction stress. L2' is smaller than L2 because of the contraction stress. In this case, the size change rate of the first portion is expressed by the following formula (2). The size change rate of the second portion is expressed by the following formula (3).

$$\Delta L1 = (L1 - L1')/L1 \tag{2}$$

$$\Delta L2 = (L2 - L2')/L2 \tag{3}$$

When the cutout 18 is formed, the contraction stress is released in the cutout 18. Therefore, the contraction percentage is reduced. In this case, ΔL2 is less than ΔL0, and ΔL1 is less than ΔL0. Therefore, when the cutout 18 is formed, a size change rate in each part of the internal electrode layer 12 is reduced. Accordingly, the contact defect between the internal electrode layers 12 and the external electrodes 20a and 20b is suppressed.

It is preferable that the opening 54 is located on the side of the edge face from which the first pattern 52a of the first stack unit is not exposed, in comparison to a half between the two edge faces of the ceramic multilayer structure before the firing process. This is because the contraction stress applied to the extraction portion of the internal electrode layer 12 is reduced.

It is preferable that the opening 54 is located in an interface between the second pattern 53a and an edge on the side of the edge face from which the first pattern 52a of the first stack unit is not exposed. This is because the contraction stress applied to the extraction portion of the internal electrode layer 12 is reduced, and the influence of the cutout 19 on the capacity of the capacity region 14 is reduced.

In a simultaneous firing process in which metal conductive paste to be the external electrodes 20a and 20b is coated on both of the edge faces of the ceramic multilayer structure and is fired after the coating, the external electrodes are formed without exposing the internal electrode layers by grinding the edge faces of the multilayer chip 10 after the firing. Therefore, the embodiment has a large effect on the simultaneous firing process.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

Although the embodiments of the present invention have been described in detail, it is to be understood that the various change, substitutions, and alterations could be made hereto without departing from the spirit and scope of the invention.

What is claimed is:

1. A ceramic electronic device comprising:
a multilayer chip in which each of a plurality of dielectric layers and each of a plurality of internal electrode layers are alternately stacked, a main component of the dielectric layers being ceramic, the multilayer structure having a rectangular parallelepiped shape, the plurality of internal electrode layers being alternately exposed to a first end face and a second end face of the multilayer structure, the first end face facing with the second end face,
a first external electrode provided on the first end face; and
a second external electrode provided on the second end face,
wherein a first dielectric layer of the plurality of dielectric layers has a concavity which is recessed toward one side of a stacking direction of the multilayer chip,
wherein a first internal electrode layer of the plurality of internal electrode layers crosses the concavity and has a cutout in the concavity,
wherein the first internal electrode layer is next to the first dielectric layer and is positioned on other side of the stacking direction.

2. The ceramic electronic device as claimed in claim 1, wherein the first internal electrode layer is connected to the first external electrode,
wherein the cutout is located on a side of the first external electrode, in comparison to a half between the first external electrode and the second external electrode.

3. The ceramic electronic device as claimed in claim 2, wherein the concavity is located on an edge of a second internal electrode layer of the plurality of internal electrode layers on a side of the first external electrode, wherein the second internal electrode layer is next to the first dielectric layer and on the one side of the stacking direction.

4. The ceramic electronic device as claimed in claim 1, wherein the ceramic electronic device is a ceramic multilayer capacitor.

5. The ceramic electronic device as claimed in claim 4, wherein the ceramic multilayer capacitor has a length of 0.25±0.015 mm, a width of 0.125±0.015 mm, and a height of 0.125±0.015 mm.

6. The ceramic electronic device as claimed in claim 4, wherein the ceramic multilayer capacitor has a length of 0.4±0.02 mm, a width of 0.2±0.02 mm and a height of 0.2±0.02 mm.

7. A manufacturing method of a ceramic electronic device comprising;
- a first process of providing a first pattern of metal conductive paste on a green sheet including main component ceramic grains;
- a second process of providing a second pattern including main component ceramic grains, on an area of the green sheet around the metal conductive paste;
- a third process of stacking a plurality of stack units obtained by the second process so that positions of the first pattern are alternately shifted and the first pattern is alternately exposed to two end faces of a ceramic multilayer structure obtained by the stacking; and
- a fourth process of firing a ceramic multilayer structure obtained by the third process, wherein, in the ceramic multilayer structure before the firing of the fourth process, a first stack unit of the plurality of stack units has a concavity on a surface on a side of a second stack unit next to the first stack unit, wherein the concavity is located on a part of an area of the metal conductive paste of the second stack unit.

8. The method as claimed in claim 7, wherein the concavity is located on a side of an end face to which the first pattern of the first stack unit is not exposed, in comparison to a half between the two end faces of the ceramic multilayer structure.

9. The method as claimed in claim 7, wherein the concavity is located in an interface between the second pattern and an edge on a side of an end face to which the first pattern of the first stack unit is not exposed.

10. The method as claimed in claim 7, wherein metal paste is coated on the two end faces of the ceramic multilayer structure before the fourth process, and after that, the fourth process is performed.

* * * * *